(12) United States Patent  (10) Patent No.: US 9,276,828 B2
Ravi et al.  (45) Date of Patent: Mar. 1, 2016

(54) SYSTEM AND METHOD FOR A SERVICE METERING FRAMEWORK IN A NETWORK ENVIRONMENT

(71) Applicant: CISCO TECHNOLOGY, INC., San Jose, CA (US)

(72) Inventors: Gunupuree Ravi, Karnataka (IN); Meghana S. Joglekar, Fremont, CA (US); Sahil Sharma, Karnataka (IN); Yun Xue, Sunnyvale, CA (US); Alok Batra, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/613,479

(22) Filed: Feb. 4, 2015

(65) Prior Publication Data
US 2015/0149628 A1    May 28, 2015

Related U.S. Application Data

(63) Continuation of application No. 13/706,174, filed on Dec. 5, 2012, now Pat. No. 8,983,987.

(60) Provisional application No. 61/675,604, filed on Jul. 25, 2012.

(51) Int. Cl.
*G06F 17/30* (2006.01)
*H04L 12/26* (2006.01)
(Continued)

(52) U.S. Cl.
CPC .......... *H04L 43/04* (2013.01); *G06F 17/30011* (2013.01); *G06F 17/30312* (2013.01); *G06F 17/30386* (2013.01); *G06F 17/30554* (2013.01); *G06Q 30/04* (2013.01); *H04M 15/41* (2013.01);
(Continued)

(58) Field of Classification Search
CPC ................... G06F 17/30554; G06F 17/30386; G06F 17/30011
USPC ........................................................ 707/722
See application file for complete search history.

(56) References Cited

U.S. PATENT DOCUMENTS 8,983,987 B2    3/2015  Ravi et al.
2011/0055378 A1*  3/2011  Ferris .................. G06F 11/3419
709/224

(Continued)

OTHER PUBLICATIONS

U.S. Appl. No. 13/706,174, filed Dec. 5, 2012 entitled "System and Method for Service Metering Framework in a Network Environment," Inventors: Gunupuree Ravi et al.

(Continued)

*Primary Examiner* — Joshua Bullock
(74) *Attorney, Agent, or Firm* — Patent Capital Group

(57) ABSTRACT

A method is provided in one example embodiment executed at a service metering framework (SMF) engine including a processor, and includes interfacing, by an event listener at the SMF engine, with an application being executed in a cloud by a remote client device, detecting a metering event associated with the application during execution of the application, receiving a value of at least one metering attribute associated with the metering event, and storing the at least one metering attribute and the value as a formatted metered record in a SMF database searchable according to the metering attribute. In a specific embodiment, the event listener exposes an application programming interface (API) of the SMF engine to the application to facilitate definitions of the metering event and the at least one metering attribute in the application.

20 Claims, 10 Drawing Sheets

(51) Int. Cl.
G06Q 30/04 (2012.01)
H04M 15/00 (2006.01)

(52) U.S. Cl.
CPC .............. *H04M 15/43* (2013.01); *H04M 15/51* (2013.01); *H04M 15/80* (2013.01); *H04M 15/82* (2013.01)

(56) References Cited

U.S. PATENT DOCUMENTS

| | | | |
|---|---|---|---|
| 2011/0138034 A1 | 6/2011 | Brookbanks et al. | |
| 2011/0145094 A1* | 6/2011 | Dawson et al. | 705/26.63 |
| 2011/0202594 A1 | 8/2011 | Ricci | |
| 2012/0116937 A1* | 5/2012 | Van Biljon et al. | 705/34 |
| 2012/0131194 A1* | 5/2012 | Morgan | 709/226 |

OTHER PUBLICATIONS

King, Charles, "Pund-IT Research Marketplace Update: IBM Usage and Accounting Manager Helping Companies Align Technical and Business Goals," Pund-IT, Inc., Oct. 2007, 6 pages; www.pund-it.com.

Mahmoud, Qusay, "Getting Started with Java Message Service (JMS)," Nov. 2004, 9 pages http://java.sun.com/developer/technicalArticles/Ecommerce/jms/.

"SaaSy: Features Overview," SaaSy, a Fast Spring Service, Copyright © 2011-2012 Bright Market, LLC d/b/a FastSpring. All rights reserved. Published on or about Feb. 9, 2011, 20 pages; http://saasy.com/features.php.

"TRACT: Boost Consumption and Create New Sources of Revenue With Activity-Based Billing," Transverse White Paper, Transverse LLC, available at www.gotransverse.com; published on or about Jul. 22, 2012; 6 pages.

"TRACT: Complex Billing. Simplified," Transverse LLC, available at http://www.gotransverse.com/tract, published on or about Jul. 12, 2012; 5 pages.

"Chargify Overview," © Chargify LLC. All Rights Reserved. First published on or about Sep. 18, 2010; 1 page; http://docs.chargify.com/overview.

"Cloud Management—An Overview," Oracle® Enterprise Manager Cloud Administration Guide, 12c Release 2 (12.1.0.2), Mar. 2012; 7 pages http://docs.oracle.com/html/E28814_01/cloud_overview_new.htm#CEG.

Danjou, Julien, "openstack Cloud Software: Ceilometer, The OpenStack metering project," available at julien.danjou.info/blog/2012/openstack-metering-ceilometer, Jul. 26, 2012; 17 pages.

"Efficient Metering in OpenStack Blueprint," Wikipages, Jul. 27, 2012, 5 pages; http://wiki.openstack.org/EfficientMetering.

"Efficient Metering; Architecture ProposalV1," Wikipages, May 22, 2012, 3 pages; http://wiki.openstack.org/EfficientMetering/ArchitectureProposalV1.

"Enterprise Manager 12c Cloud Control Metering and Chargeback," Oracle White Paper, Oracle Enterprise Manager 12c, Apr. 2012, 29 pages.

* cited by examiner

FIG. 7

```xml
<?xml version='1.0' encoding='UTF-8' standalone='yes'?>
<MeterableObject identifier="video_service" ownerName="Cisco.com">
    <MeterableObjectDefinition>
        <Attribute datatype="String" name="sessionId" displayLabel="Session ID"/>
        <Attribute datatype="String" name="userId" displayLabel="UserID"/>
        <Attribute datatype="long" name="bytes_sent" displayLabel="Bytes Sent"/>
        <Attribute datatype="long" name="bytes_received" displayLabel="Bytes Rec"/>
        <Attribute datatype="date" name="start_time" displayLabel="Start Time"/>
        <Attribute datatype="date" name="end_time" displayLabel="End Time"/>
        <Attribute datatype="String" name="os" displayLabel="Operating System"/>
        <Attribute datatype="String" name="flash_ver" displayLabel="Flash Version"/>
        <Attribute datatype="String" name="resolution" displayLabel="Resolution"/>
        <Attribute datatype="String" name="camera" displayLabel="Camera"/>
        <Attribute datatype="String" name="mic" displayLabel="Microphone"/>
        <Attribute datatype="String" name="participant" displayLabel="Participant"/>
        <Attribute datatype="long" name="durartion" displayLabel="Call Duration(SEC)"/>
        <UniqueKeySet>
            <UniqueKey>
                <AttributeName>sessionId</AttributeName>
                <AttributeName>userId</AttributeName>
            </UniqueKey>
        </UniqueKeySet>
    </MeterableObjectDefinition>
</MeterableObject>
```

| HTTP REQUEST TYPE: POST | UPLOAD METERABLE OBJECT |
|---|---|
| http://{host} : {port}/VSXMeteringServices/metering/rest/service/uploadMeterableObject ||
| WHERE, ||
| HOST | HOSTNAME OR IP ADDRESS FOR METERING SERVICES |
| PORT | THE PORT NUMBER ON WHICH METERING SERVICES IS LISTENING |
| SAMPLE-REQUEST HEADER | CONTENT-TYPE: multipart/form-data |
| SAMPLE REQUEST (NON-BROWSER) | INPUT STREAM OF ZIP FILE CONTAINING Metering.xml. |
| SAMPLE XML RESPONSE (SUCCESS) | \<response\><br>  \<successful\>true\</successful\><br>\</response\> |
| SAMPLE XML RESPONSE (FAILURE) | \<response\><br>  \<errorCode\>Internal Application Error.\</errorCode\><br>  \<errorMessage\>Attribute with name sessionId already specified in one of the UniqueKeys\</errorMessage\><br>  \<successful\>false\</successful\><br>\</response\> |

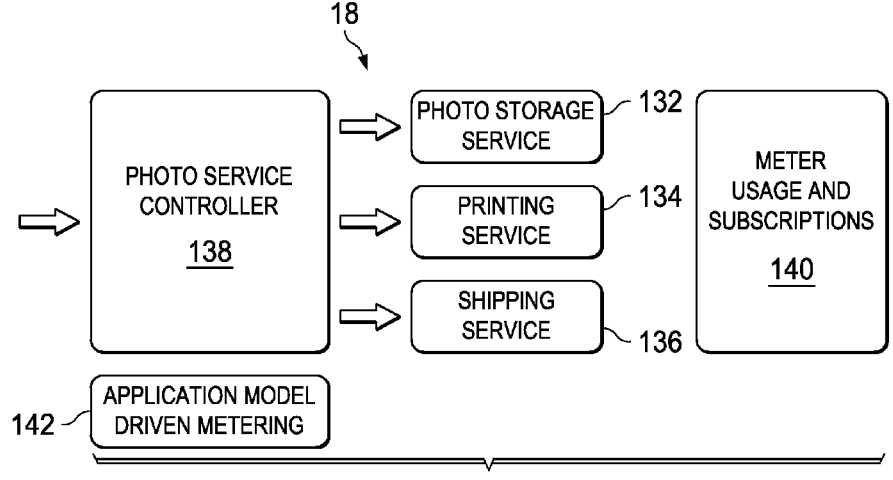

Report.pdf - Adobe Reader

Search report for SMF Services.

| SERVICE NAME | TOTAL_TIME | IDENTITYID | SESSIONID | BYTES_SENT | BYTES_RECEIVED |
|---|---|---|---|---|---|
| video | 110 | 1 | 1 | 1 | 1 |
| video | 110 | 1 | 110 | 3210 | 2310 |
| video | 110 | 1 | 111 | 3211 | 2311 |
| video | 110 | 1 | 112 | 3212 | 2312 |
| video | 110 | 1 | 113 | 3213 | 2313 |
| video | 110 | 1 | 114 | 3214 | 2314 |
| video | 110 | 1 | 115 | 3215 | 2315 |
| video | 110 | 1 | 116 | 3216 | 2316 |
| video | 110 | 1 | 117 | 3217 | 2317 |

Microsoft PowerPoint

| | A | B | C | D | E | F | G |
|---|---|---|---|---|---|---|---|
| 1 | SERVICE N | TOTAL_TIME | IDENTITYID | SESSIONID | BYTES_SENT | BYTES_RECEIVED | |
| 2 | video | 110 | 1 | 1 | 1 | 1 | |
| 3 | video | 110 | 1 | 110 | 3210 | 2310 | |
| 4 | video | 110 | 1 | 111 | 3211 | 2311 | |
| 5 | video | 110 | 1 | 112 | 3212 | 2312 | |
| 6 | video | 110 | 1 | 113 | 3213 | 2313 | |
| 7 | video | 110 | 1 | 114 | 3214 | 2314 | |
| 8 | video | 110 | 1 | 115 | 3215 | 2315 | |
| 9 | video | 110 | 1 | 116 | 3216 | 2316 | |
| 10 | video | 110 | 1 | 117 | 3217 | 2317 | |
| 11 | video | 110 | 1 | 118 | 3218 | 2318 | |
| 12 | video | 110 | 1 | 119 | 3219 | 2319 | |

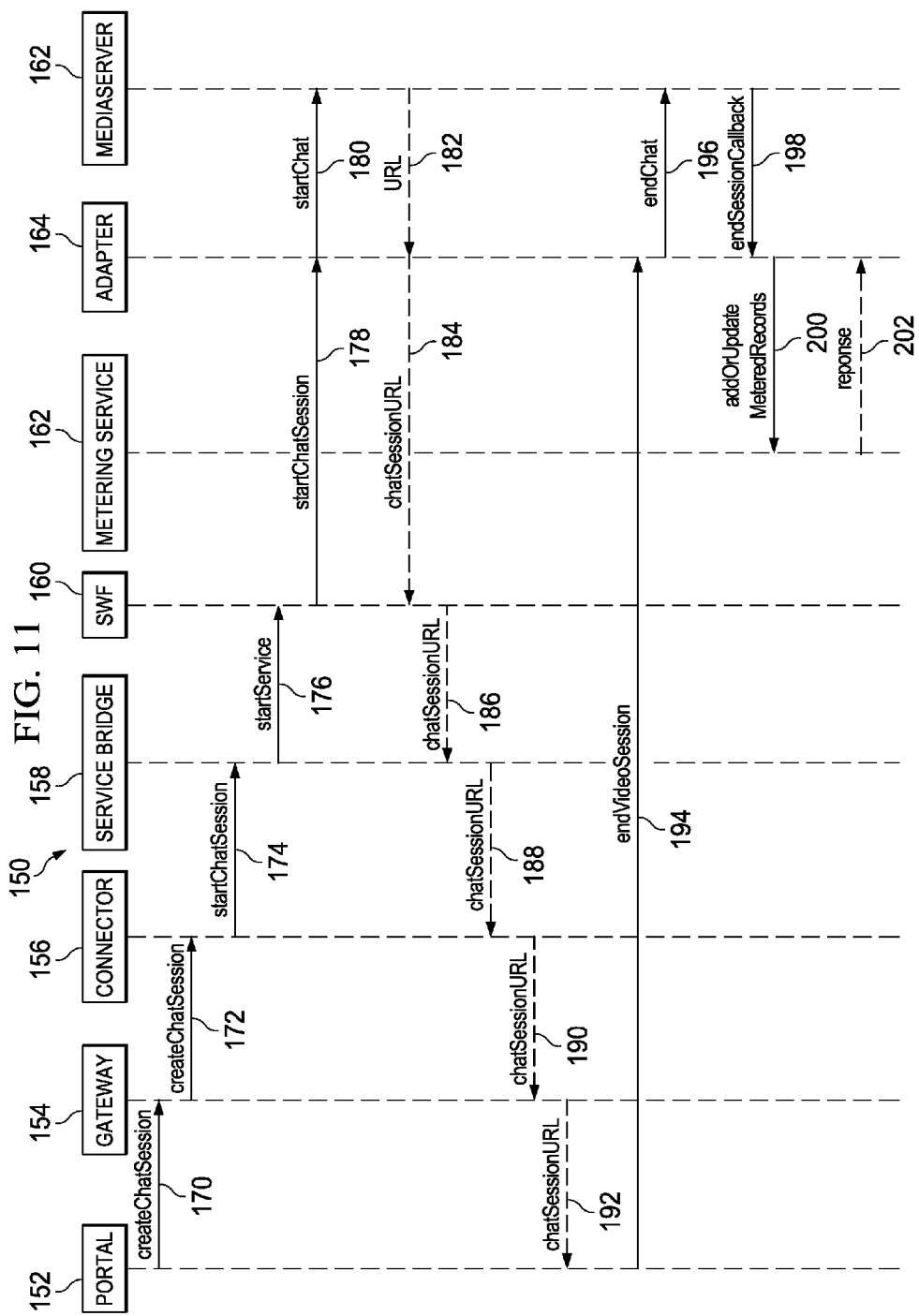

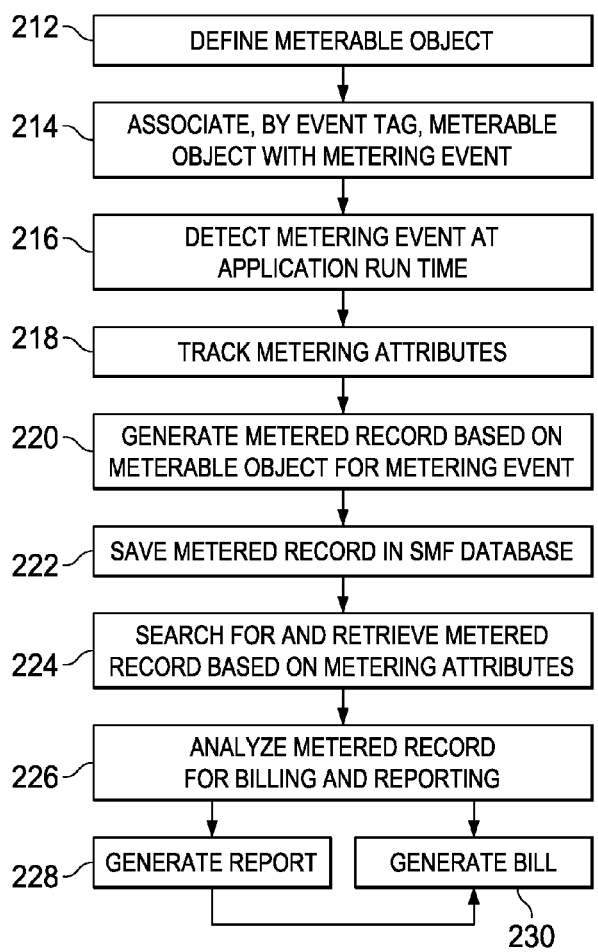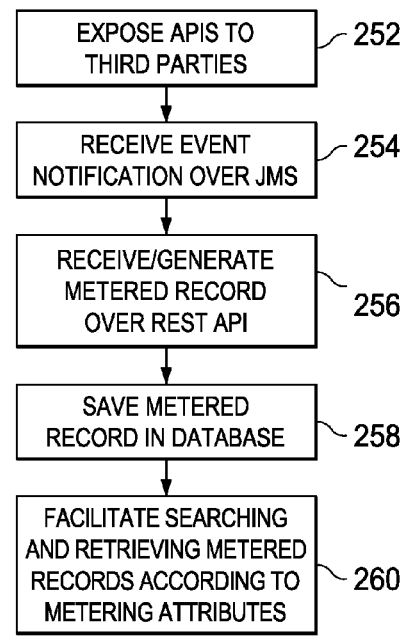

SYSTEM AND METHOD FOR A SERVICE METERING FRAMEWORK IN A NETWORK ENVIRONMENT

CROSS-REFERENCE TO RELATED APPLICATION

This application is a continuation (and claims the benefit of priority under 35 U.S.C. §120) of U.S. application Ser. No. 13/706,174, filed Dec. 5, 2012, entitled "SYSTEM AND METHOD FOR A SERVICE METERING FRAMEWORK IN A NETWORK ENVIRONMENT," Inventors Gunupuree Ravi, et al., which claims the benefit of priority under 35 U.S.C. §119(e) to U.S. Provisional Application Ser. No. 61/675,604, entitled "Service Metering Framework (SMF)," filed Jul. 25, 2012. The disclosures of each of the prior applications are considered part of (and are incorporated by reference in) the disclosure of this application.

TECHNICAL FIELD

This disclosure relates in general to the field of communications and, more particularly, to a system and a method for a service metering framework in a network environment.

BACKGROUND

Cloud computing represents a paradigm shift that benefits individual consumers, enterprises, and service providers. Information technology (IT) resources and services in the cloud may be abstracted from underlying infrastructure and provided on demand and at scale in a shared multitenant and elastic environment. Cloud services may be characterized by various parameters, including a payment or pricing model (e.g., pay-as-you-go, usage based pricing), elasticity (e.g., users can dynamically consume more or less resources), location independence, high fault tolerance, high availability, and ubiquitous access to services (e.g., users can access the services from any location, using any device). Cloud services include storage, network, and computing, facilitating various service models, such as infrastructure as a service (IaaS), platform as a service (PaaS) and software as a service (SaaS). The increasing number of applications, data and services offered in the cloud pose a challenge to service providers and enterprises in terms of various parameters, including managing the demand, and metering the usage.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a simplified block diagram illustrating yet other example details of an embodiment of the communication system;

FIG. 8 is a simplified diagram illustrating yet other example details of an embodiment of the communication system;

FIG. 9 is a simplified screen shot illustrating yet other example details of an embodiment of the communication system;

FIG. 10 is a simplified block diagram illustrating example details of an embodiment of the communication system;

FIG. 11 is a simplified sequence diagram illustrating example operations of an embodiment of the communication system;

FIG. 12 is a simplified flow diagram illustrating example operations that may be associated with an embodiment of the communication system; and FIG. 13 is a simplified flow diagram illustrating other example operations that may be associated with an embodiment of the communication system.

DETAILED DESCRIPTION OF EXAMPLE EMBODIMENTS

Overview

A method is provided in one example embodiment and includes causing generation of a metered record associated with a metering event of an application executed within a cloud-based computing system. The metered record comprises a metering attribute and a corresponding value associated with the metering event, and the corresponding value is determined substantially simultaneous to a runtime execution of the application. In addition, the method can include generating a search result for the metered record based on the metering attribute and the corresponding value. In specific embodiments, the metered record is communicated using a REpresentational State Transfer (REST) Application Programming Interface (API).

Example Embodiments

Figure 1:
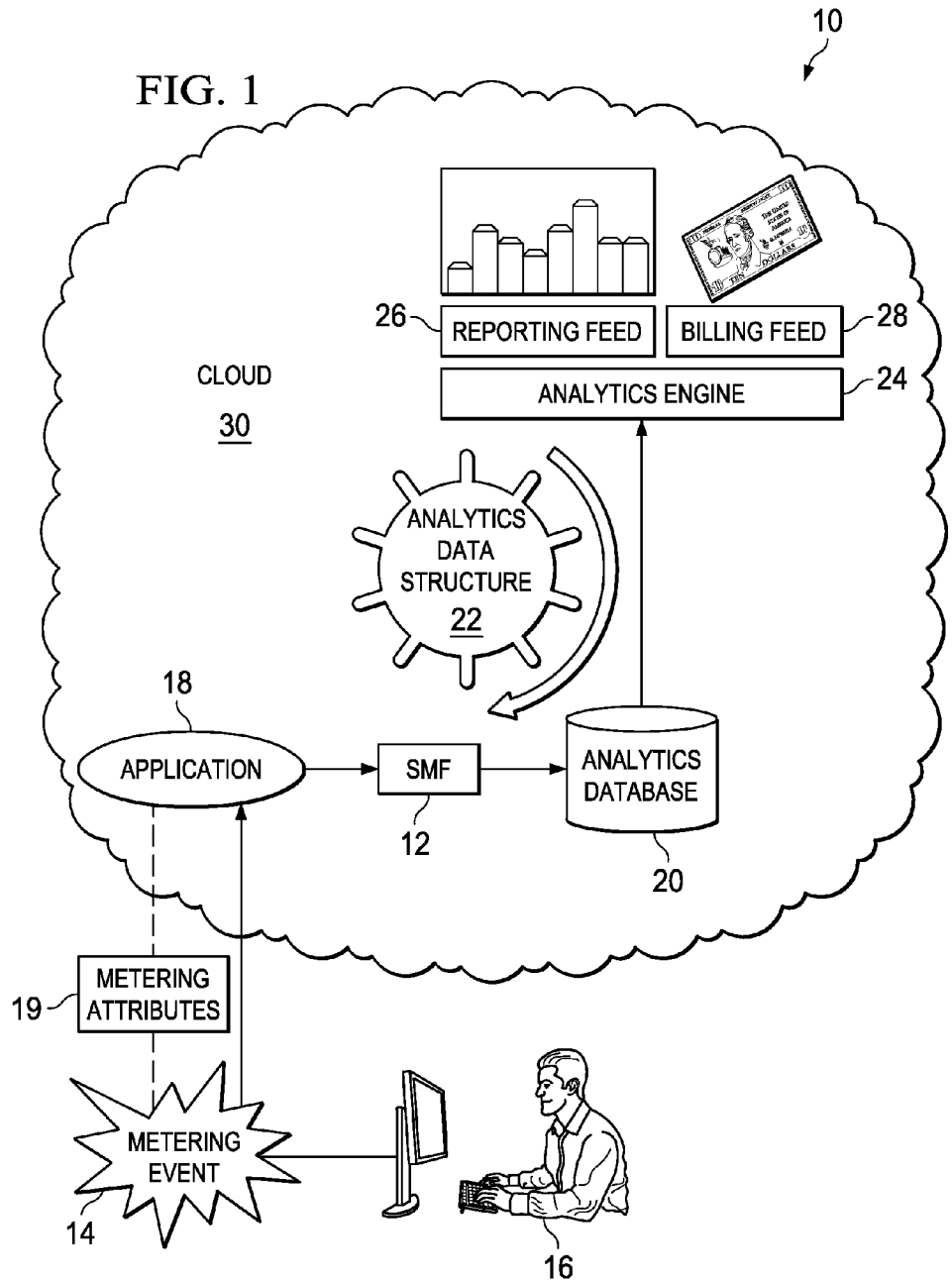
FIG. 1 is a simplified block diagram illustrating a communication system for service metering framework in a network environment according to an example embodiment.

Turning to FIG. 1, FIG. 1 is a simplified block diagram illustrating a communication system 10 for a service metering framework (SMF) in a network environment. Communication system 10 includes an SMF 12 that receives notification of a metering event 14 that a subscriber 16 generates at an application 18. Metering event 14 may be associated with metering attributes 19 of application 18. Metering attributes 19 may be metered (e.g., measured, tracked, followed, quantified, calculated, determined, etc.) at least by application 18 and (with corresponding values) sent to SMF 12. Metering attributes 19 and corresponding values may be copied to an analytics database 20 using an analytics data structure 22. An analytics engine 24 may analyze the metered data and provide a reporting feed 26 and a billing feed 28. Application 18, SMF 12, and other components may be located in a cloud 30.

In particular embodiments, cloud 30 is a collection of hardware devices and executable software forming a shared pool of configurable computing resources (e.g., networks, servers, storage, applications, services, etc.) that can be suitably provisioned to provide on-demand self-service, network access, resource pooling, elasticity and measured service, among other features. Cloud 30 may be deployed as a private cloud (e.g., infrastructure operated by a single enterprise/organization), community cloud (e.g., infrastructure shared by several organizations to support a specific community that has shared concerns), public cloud (e.g., infrastructure made available to the general public), or a suitable combination of two or more disparate types of clouds.

Cloud 30 may be managed by a cloud service provider, who can provide subscriber 16 with at least access to cloud 30, and authorization to use application 18 in accordance with predetermined service level agreements (SLAs). Subscriber 16 may have an account with the cloud service provider, and may be billed by the cloud service provider based on a variety of factors, including cloud resources used by subscriber 16, number of individual users authorized by subscriber 16 to access cloud 30, and activities on applications (e.g., application 18) hosted and executing on cloud 30.

Certain terminologies are used with regard to the various embodiments of the present disclosure. As used herein, the term "application" can be inclusive of an executable file comprising instructions that can be understood and processed on a computing device such as a computer, and may further include library modules loaded during execution, object files, system files, hardware logic, software logic, or any other executable modules. Applications are generally configured to perform particular tasks, such as computing, word processing, manipulating graphics and images, measuring, rendering, etc.

As used herein, the term "metering event" associated with an application (e.g., application 18) can include an action (e.g., function call, function exit, mouse click, keyboard entry, cursor movement, joystick movement or touchpad-detected movement, application state change, etc.) associated with the application that affects a billing status of subscriber 16's account in cloud 30. Metering event 14 can cause additional billing actions to be added to subscriber 16's account, for example. In another example, consider a photo printing service application 18 that enables subscriber 16 to store and retrieve images, print photos in various formats and sizes, and ship the printed photos. Each store request for an image can be a metering event; each print request can be another metering event; each ship request can be yet another metering event; a request for a holiday postcard print can be yet another metering event; an overdue shipment can trigger yet another metering event; and so on.

As used herein, the term "subscriber" can include an entity (a natural person, a company, an organization, etc.) that accesses cloud 30 through one or more devices such as computers, laptops, smartphones, mobile computing devices, mobile phones, iPads™, Google Droids, Microsoft® Surfaces, Google Nexuses™, etc. Subscriber 16 can generate metering event 14 through the one or more devices while accessing (and executing) application 18. For example, turning to the photo printing service example, subscriber 16 may click on a "print photo" button in a user interface of application 18, generating metering event 14 as a request to print the photo.

As used herein, the term "metering attribute" can include an attribute (e.g., a quality, feature, trait, aspect, element, characteristic, property, etc.) of application 18 that may be metered. By way of examples and not limitations, metering attributes 19 in a video chat service application 18 may include host, participant, session duration, bytes sent, etc. Other examples of metering attributes 19 include user id of subscriber 16; session id of communication session with application 18; bytes send over the communication session with application 18; number of photos printed in a printer service application 18; and so on. Metering attributes depend on the application, and other factors chosen by the application developer based on various needs, such as business needs.

For purposes of illustrating the techniques of communication system 10, it is important to understand the communications in a given system such as the system shown in FIG. 1. The following foundational information may be viewed as a basis from which the present disclosure may be properly explained. Such information is offered for purposes of explanation only and, accordingly, should not be construed in any way to limit the broad scope of the present disclosure and its potential applications.

Measuring resource usage for billing purposes is commonly implemented in cloud based service delivery platforms. Currently available metering and billing systems generally meter resource usage and/or provide subscription based models. For example, metering and billing in IaaS may be based on the number of server instances used in a billing cycle typically on a per-month basis. PaaS billing and metering are also typically determined by actual usage, for example, the network bandwidth, central processing unit (CPU) utilization, and disk usage per transaction or application can determine PaaS cost. Typical SaaS metering and billing follow a monthly fixed cost (e.g., monthly subscription), depending on the amount of data or the number of subscribers. Subscription based billing allows for business to sell periodic (monthly, yearly, etc.) access to cloud based products and services.

Alternately, activity-based billing creates a process for measuring, aggregating, analyzing, rating, charging, invoicing, payment processing, and reporting on individual subscriber or user engagements. Activities that can be rated, metered, and charged may be identified and tracked in such models. Examples of such activities include downloading a file, streaming data (e.g., music, video), communicating, uploading photos, viewing a file, playing a game, etc. The cloud service provider determines meterable activities and bills accordingly. Current systems that provide activity based billing put control in the hands of the cloud service providers, rather than the application developers who have better knowledge of their applications hosted on the cloud. Thus, currently available activity based billing may fail to take certain application specific activities into account, or they may overcharge for activities that are not significant for the specific application, among other disadvantage.

In a general sense, applications delivered over the cloud infrastructure can vary in the features each application provides. For example, a video chat application provides a different set of features compared to a backup application. The features may command varying prices that may be independent of actual resource usage, in terms of application instances, computing power, and subscribers. Outside the cloud context, such applications can be priced variously. For example, the video chat application that runs off a laptop may be priced differently from the backup application executing on the same laptop, although they may use identical computing resources. However, when translated to the cloud context, both the video chat application and the backup application may be priced identically because of their identical resource usage. There are currently no solutions that provide an application model driven metering approach, where the application's unique attributes and corresponding values are considered in generating bills specific to the application.

Communication system 10 is configured to address these issues (and others) in offering a system and a method for enhancing metadata in a video processing environment.

Embodiments of communication system 10 can receive a notification of metering event 14 of application 18 executing in cloud 30, where metering event 14 is associated with one or more metering attributes 19, communicate metering attributes 19 and corresponding values of metering attributes 19 as a metered record (e.g., 60 of FIG. 3), the values being determined during a runtime of application 18, and facilitate searching for the metered record based on metering attributes 19 and respective values of metering attributes 19. In various embodiments, SMF 12 can provide application model driven metering. SMF 12 can complement existing metering systems by further allowing the applications (e.g., application 18) executing on cloud 30 to measure subscription usage and capture metering data based on their own business context and logic.

In general, each application 18 hosted on the cloud may have unique metering attributes 19. According to various embodiments, a data structure (e.g., "SMF data structure" 40 of FIG. 3) for capturing and storing information related to metering event 14 may be configured in application 18 appropriately. As used herein, the term "data structure" can include a particular way of storing and organizing data on one or more non-transitory machine-readable storage media. Examples of data structures may include records (e.g., a value that contains other values organized according to fields), arrays (e.g., a number of elements stored in rows and columns), objects (e.g., similar to records, with additional program code fragments for accessing and modifying the fields), sets (e.g., values stored in no particular order), etc.

The SMF data structure may be provided by SMF 12 to application 18. A meterable object (e.g., data object that can be manipulated using an appropriate programming language, like Java) that indicates metering attributes 19 may be defined using the SMF data structure and configured in application 18. The meterable object may be appropriately configured in application 18 during configuration of application 18 in cloud 30, or otherwise before occurrence of metering event 14, and its attribute values populated during runtime of application 18, for example, when metering event 14 is generated. A metered record may be generated for the meterable object including values of metering attributes 19 for metering event 14.

Application 18 may be configured with appropriate components to allow interfacing with SMF 12 during runtime. For example, suitable metering agents in application 18 can detect occurrence of metering event 14, and provide SMF 12 with the metered record of metering event 14. An appropriate data adapter in SMF 12 can insert the metered record in a suitable database or other data store in SMF 12. The database may be configured to enable searching for individual metered records as needed. The metered record may be accessed by analytics database 20 as and when needed.

SMF 12 can provide a metering framework to keep track of various aspects of service usage of application 18 for reporting and billing purposes. In specific embodiments, SMF 12 may capture implicit and/or explicit metering events (e.g., metering event 14) through multiple sources through a metadata based definition. Billing and reporting systems (e.g., analytics engine 24) external to SMF 12 can integrate with SMF 12 to fulfill monetization specifications of applications (e.g., application 18) executing on service delivery platforms in cloud 30.

SMF 12 can integrate with existing metering and billing software through REpresentational State Transfer (REST) Application Programming Interfaces (APIs), which can be invoked by external REST based services to store metered records; and a Java Message Service (JMS) Listener, which can listen to metering events by JMS based services. Other REST API-like or JMS-like systems may also be suitably integrated with appropriate integration modules in SMF 12.

In general, REST-style architectures include clients, which initiate requests, and servers, which process the requests and return appropriate responses. Requests and responses are built around a transfer of representations of resources. A resource is typically any coherent and meaningful source of information that may be addressed; each resource is referenced with a global identifier (e.g., Uniform Resource Indicator (URI) in Hyper Text Transfer Protocol (HTTP)). A representation of the resource is typically a document that captures the current or intended state of the resource.

REST style architectural style also includes cacheable responses (e.g., responses may implicitly or explicitly define themselves as cacheable), a layered system (e.g., client may be connected to the server via an intermediary), code on demand (e.g., servers may extend client functionalities by transferring executable code, such as Java applets), and a uniform interface (e.g., facilitating communication between the client and the server). The uniform interface can specify identification of resources, manipulation of resources through appropriate representations, self-descriptive messages and hypermedia as an engine of application state (e.g., clients make state transitions through actions that are dynamically identified within hypermedia, such as by hyperlinks within hypertext (e.g., simultaneous representation of information and controls such that the information becomes a medium through which actions may be selected), by the server). In general, REST architecture allows for a REST event transmitter (e.g., metering agent) that can synchronously publish events (e.g., metering event 14) to a REST based listener (SMF 12) in the network.

REST APIs can include web services implemented using HTTP. For each web service, REST APIs can include a base URI (e.g., http://www.xyz.com); an Internet media type of data (e.g., in XML format) supported by the web service; a set of operations (e.g., GET, PUT, etc.) supported by the web service using HTTP methods; and a hypertext driven API. In general, the REST API is not dependent on any single communication protocol. In various embodiments, the metered record may be communicated between application 18 (and/or metering agents associated therewith) and SMF 12 with REST APIs (e.g., using HTTP methods).

JMS is an enterprise messaging API that can facilitate synchronous message transfer of data and events between clients and servers. As a messaging service, it is equivalent to the REST API, but operates differently. JMS defines a set of interfaces and semantics that allow Java applications to communicate with other messaging implementations. JMS supports two different message delivery models: Point-to-Point (Queue destination) and publish/subscribe (topic destination).

In the point-to-point model, a message is delivered from a producer (e.g., messaging system that implements the JMS specification) to one recipient. The messages are delivered to the destination, which is a queue, and then delivered to one of the recipients registered for the queue. While any number of producers can send messages to the queue, each message is guaranteed to be delivered, and consumed by one recipient. In the publish/subscribe model, a message is delivered from the producer to any number of recipients. Messages are delivered to the topic destination, and then to all active recipients who have subscribed to the topic. In addition, any number of producers can send messages to a topic destination, and each message can be delivered to any number of recipients. In various embodiments, notification of metering event 14 may be sent according to point-to-point or publish/subscribe methods to SMF 12.

Embodiments of communication system 10 can provide a generic metering and billing model capable of storing metering data of discrete applications (such as application 18). A generic framework may be provided that allows runtime addition of new metering definitions for application 18 and insertion of metered records against those definitions. A generic search framework may be also included that is capable of executing complex queries against the metered records of application 18.

SMF 12 may include export capability to export the searched metered records into various formats. A generic user interface (UI) may further assist in performing advanced search. In particular embodiments, SMF 12 can facilitate basic usage and subscription based metering as a standalone metering framework and can complement other metering solutions by providing the ability to add business context level metering. SMF 12 can provide integration points for application developers to enhance their control over what and how their applications are metered in cloud 30.

In various embodiments, communication system 10 can provide a generic framework with ability to add new definitions (e.g., event definitions, metering attribute definitions, etc.) at runtime. There may be no limitation of any kind on what can be metered. Unique constraints in metering definitions may be defined at runtime and enforced accordingly. Embodiments of communication system 10 can provide a framework with a generic data store, for example, where a same set of tables can store metered records having disparate attributes. In various embodiments, a generic search can be performed against the metered records in cloud 30.

Turning to the infrastructure of communication system 10, the network topology in and outside cloud 30 can include any number of servers (e.g., server devices, virtual machines etc. executing server applications), routers, gateways, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network.

Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that the communication system 10 shown in FIG. 1 is simplified for ease of illustration.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, application 18 may be hosted on one or more servers (e.g., devices executing server applications), virtual machines, or other suitable infrastructure in cloud 30. In some embodiments, application 18 may be a distributed application, with separate components executing in disparate machines within cloud 30. SMF 12 may be hosted in one or more servers in cloud 30. In some embodiments, each application 18 may interface with a separate SMF 12; in other embodiments, a central SMF 12 may interface with a plurality of applications. SMF 12 may be implemented as a combination of hardware and software to enable the operations described herein.

Analytics engine 24 may be hosted on one or more servers (e.g., devices executing server applications), virtual machines, or other suitable infrastructure in cloud 30. Analytics engine 24 may operate on information stored in analytics database 20, using analytics data structure 22 to perform its computations. Analysis operations may include data mining, compiling, data comparisons, computations, log analysis, and other such activities to generate reporting feed 28 and billing feed 28. In some embodiments, analytics engine 24 may compile information from myriad applications involving various metering events and process them according to SLAs of each subscriber to generate appropriate bills and reports.

In some embodiments, reporting feed 28 may include feeds for informative purposes (e.g., log feeds), such as to alert a network administrator of certain events that require action, or to inform about resource usage, etc. Billing feed 28 may include information that can be used to generate bills to subscriber 16 that capture metering event 14 and other billable activities.

SMF 12 can provide various advantages, including: metering responsibility may be handed off to application developers and SMF 12; SMF 12 may provide flexible data storage for any kind of metering events. Each metering event 14 can have different schema for its definition (e.g., a service like Zillow® can define metering event 14 as "memory consumption and CPU usage in last one hour," and "user's age and user's region."); application developers can meter events driven by their individual business models (e.g., metering events can respond to business processes to enable better monetization of the application services); and SMF 12 can complement other metering systems installed in cloud 30.

Figure 2:
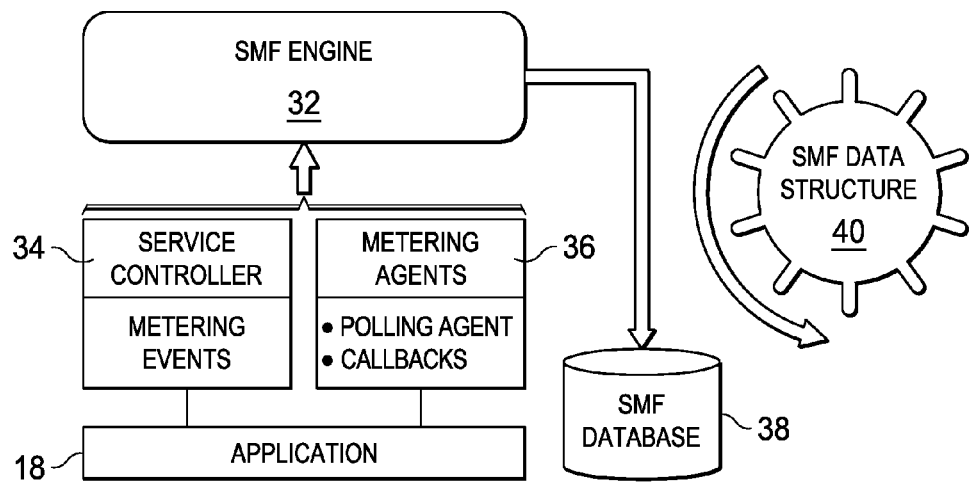
FIG. 2 is a simplified block diagram illustrating example details of an embodiment of the communication system.

Turning to FIG. 2, FIG. 2 is a simplified block diagram illustrating example details of communication system 10. SMF engine 32 may interact with a service controller 34 that can register metering events (e.g., metering event 14) with SMF engine 32. Service controller 34 can include a software component that can access and manage application 18 executing in cloud 30. In particular, service controller 34 can define (e.g., describe, name, label, identify, characterize) metering event 14 for application 18 according to APIs provided by SMF 12. For example, service controller 34 may define metering event 14, associate it with metering attributes 19 when application 18 is executing in cloud 30. Subsequently, application 18 may detect metering event 14 (e.g., as defined by service controller 34) when the action specified therein occurs. After metering event 14 (e.g., as defined by service controller 34) is detected, service controller 34 may generate a metered record for metering event 14 and provide the metered record to SMF engine 32 during application runtime.

In some embodiments, service controller 34 may be a service broker that provides real time service orchestration and manages data related to application usage and subscriber profiles; in other embodiments, service controller 34 may be a management software that enables an administrator to configure application 18 during runtime; in yet other embodiments, service controller 34 may be a part of application 18 that translates instructions into configuration semantics; in yet other embodiments, service controller 34 may receive messages in application 18 and process them accordingly. Service controller 34 may be implemented in myriad different ways within the broad scope of the embodiments.

Metering agents 36 can detect metering event 14 and notify SMF engine 32 accordingly. In some embodiments, metering agents 36 may be configured to track metering attributes of application 18 and report back to SMF engine 32. Metering agents 36 can include polling agents (e.g., that poll application 18 periodically for metering event 14) or callbacks (e.g., that are triggered when metering event 14 is detected). In some embodiments, callbacks may be immediately called when metering event 14 occurs. In other embodiments, callbacks may be queued and reported periodically to SMF engine 32. Metering agents 36 may also include other event detecting and reporting mechanisms (e.g., asynchronous service invocations other than polling or callbacks). Metering agents 36 may be deployed at application 18, or on client devices (e.g., at subscriber 16), and may include hardware and software for real-time monitoring of application 18. Metering agent 36 can be installed in any suitable manner, based on particular application configuration and usage needs.

SMF engine 32 may obtain the metered information (e.g., as metered records) from service controller 34 and store it in an SMF database 38 according to SMF data structure 40 in some embodiments. In other embodiments, the metered record may be stored in any suitable data structure based on particular database configuration needs. In various embodiments, SMF data structure 40 may be suitably configured to enable searching metered records according to metering attributes. For example, SMF database 38 may be searched for a specific metering attribute 19 (e.g., host name in a video chat session application), to retrieve metered records having the specific metering attribute.

In various embodiments, SMF database 38 may be any suitable data store (e.g., data repository) including databases and files that can store data. Examples of SMF database 38 include relational databases such as MySQL, Microsoft SQL, Oracle databases; object-oriented databases like Caché or ConceptBase; operational data stores; schema-less data stores, like Apache Cassandra distributed data store; spreadsheets (e.g., Microsoft Excel); flat files; etc. In some embodiments, SMF database 38 may represent data in a specific schema; in other embodiments, SMF database 38 may represent data in several schema; in yet other embodiments, SMF database 38 may represent data in no particular schema.

Figure 3:
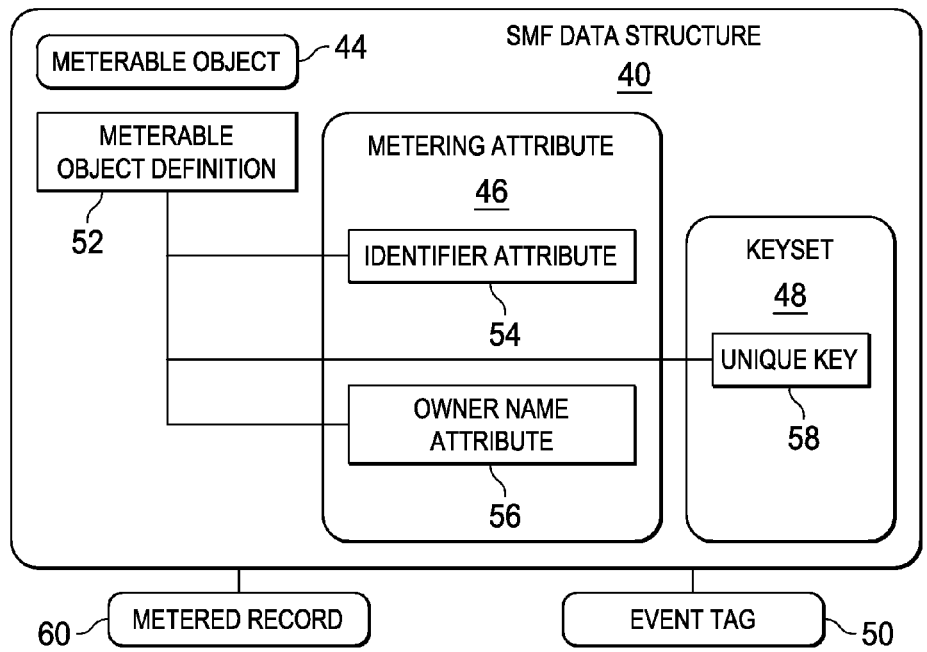
FIG. 3 is a simplified block diagram illustrating other example details of an embodiment of the communication system.

Turning to FIG. 3, FIG. 3 is a simplified block diagram illustrating example details of SMF data structure 40 according to an embodiment of communication system 10. In particular embodiments, SMF data structure 40 may include a meterable object 44, metering attribute 46, a keyset 48, and an event tag 50, among other features. During metering configuration of application 18, a specific meterable object 44 (e.g., video session) may be defined therein using a meterable object definition 52. Merely as examples, and not as limitations, meterable object definition 52 may include an identifier attribute 54, an owner name attribute 56 from metering attribute 46, and a unique key 58 from keyset 48.

Meterable object definition 52 may include any number and type of metering attribute 46 within the broad scope of the embodiments. For example, health parameters may be included as metering attribute 46 in meterable object definition 52 in a health record application 18. In another example, video session parameters (such as caller's name, call duration, etc.) may be included as metering attribute 46 in the corresponding meterable object definition 52 in a video application 18; and so on. In particular, application developers may code the specific meterable object 44 according to a specific metering attribute 46 that meet business level needs.

Identifier attribute 54 may map a particular metered record 60 generated at application runtime to a particular meterable object 44 defined during metering configuration. Metering agents 36 may add metered record 60 and associate it with the particular meterable object 44 using identifier attribute 54. Owner name attribute 56 may specify a domain name of the application developer. Unique key 58 may indicate keys or a combination of keys (e.g., single metering attribute or combination of multiple metering attributes) whose values may be considered to be unique per metered record 60. Some examples of unique key 58 include session identifier, and identity identifier.

Metered record 60 may be generated (e.g., by application 18; SMF engine 32) according to SMF data structure 40 and stored in SMF database 38 in various embodiments. Metered record 60 may include one or more specific metereable objects ("metered record objects") 44 defined variously according to meterable object definition 52. For example, in a video session, metering event 14 may be generated in response to a subscriber 16 initiating the video session. A metered record object ("video_service") (identified by a value of identifier attribute 54) owned by "Cisco.com" may be invoked and populated with a certain metering attribute 46 (e.g., session_id, user_id), etc.

Another metering event 14 may be generated in response to subscriber 16 initiates a chat session within the video session. Another metered record object ("video_chat_service") (identified by a value of identifier attribute 54) may be invoked and populated with metering attribute 46 (e.g., number of bytes sent, address of the receiver, etc.). Both the video_service meterable object and the video_chat_service meterable object may be stored as a single metered record 60 in some embodiments. In other embodiments, each meterable object may be stored as separate metered record 60.

Event tag 50 may include an association between metering event 14 and corresponding metered record 60. In some embodiments, event tag 50 may include an envelope (e.g., with appropriate headers) to wrap metered record 60. For example, an application developer of a video application may add metered record 60 through the following event tag 50:
<Event name="VideoSessionInitiated" post="jms:MyURL"

when="[:System.$OnServiceEnd:]">; <message type="string">; <value>CDATA[Metered Record XML]</value>; </message>; </Event>. The specific metering event 14 (e.g., video session end) identified in event tag 50 may be captured by SMF engine 32, which can extract a Domain Specific Language (DSL) (e.g., eXtensible Markup Language (XML)) format of metered record 60 from the body of event tag 50, convert the XML into a metered record object and save it to SMF database 38.

Figure 4:
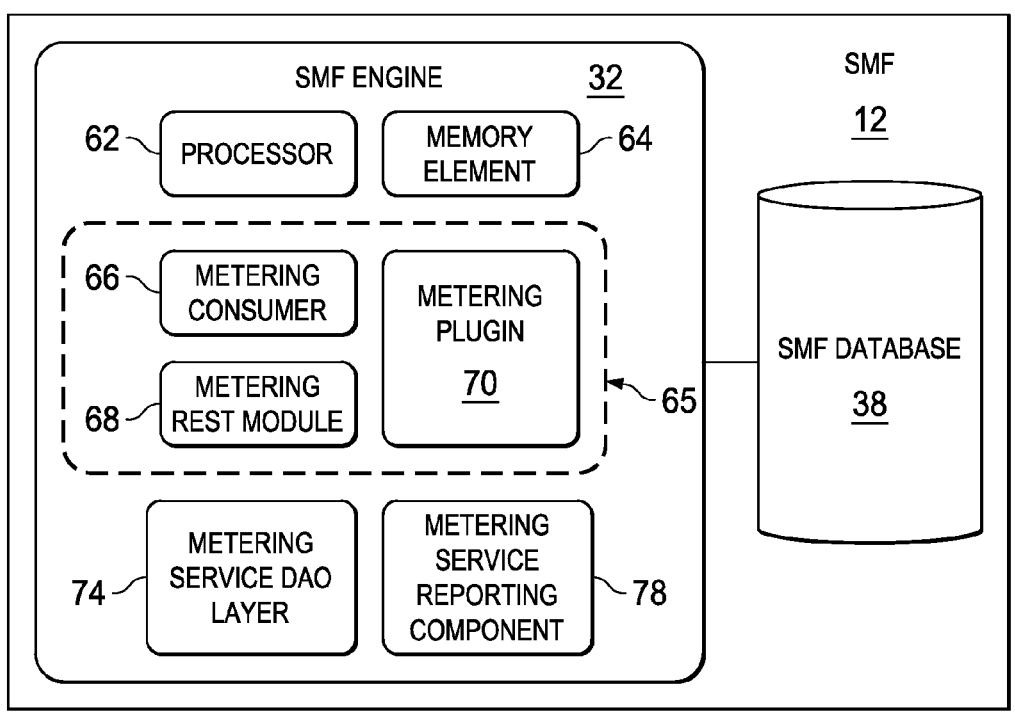
FIG. 4 is a simplified block diagram illustrating yet other example details of an embodiment of the communication system.

Turning to FIG. 4, FIG. 4 is a simplified block diagram illustrating a logical view of example details of SMF 12 according to an embodiment of communication system 10. SMF 12 may include SMF engine 32, and SMF database 38. The various logical components of SMF 12 may interact with each other suitably to enable the operations described herein. In various embodiments, by way of suitable software architecture, application developers may interface with SMF 12 and install their unique application metering attributes based on particular business (and other) needs.

SMF engine 32 may include a processor 62, a memory element 64, event listener 65, including synchronous event listeners, such as a metering consumer 66, and asynchronous event listeners, such as a metering REST module 68 and a metering plugin 70. As used herein, the term "event listener" includes code that specifies how an event (e.g., metering event 14) is to be handled. For example, event listener 65 may cause metered record 60 to be stored into SMF database 38 upon occurrence of metering event 14. Although a few event listeners are illustrated in the FIGURE, any number and type of suitable event listener 65 may be used within the broad scope of the embodiments.

According to some embodiments, event listener 65 can interface appropriately with application 18 (and metering agents 34) and detect metering event 14 using REST API, JMS, Extensible Messaging and Presence Protocol (XMPP), etc., as appropriate. In some embodiments, event listener 65 may also communicate metered record 60 with application 18 and SMF database 38. For example, event listener 65 may communicate metered record 60 with SMF database 38 using REST API (e.g., addMeteredRecords-(MeteredRecord[ ] meteredRecords)). Event listener 65 may also receive metered record 60 from metering agents 34 using REST API (e.g., addOrUpdateMeteredRecords(String meteredRecords-AsXML)).

In various embodiments, metering consumer 66 may be a JMS listener, configured to interface with JMS based metering clients. In other embodiments, metering consumer 66 may be an XMPP listener, configured to interface with XMPP metering clients. Metering consumer 66 may be a synchronous listener (e.g., when metering event 14 is detected, it is synchronously delivered to metering consumer 66 depending on the type of metering client). In various embodiments, metering consumer 66 may pick up (e.g., detect, associate, etc.) metering event 14 from a workflow queue (e.g., simple workflow service (SWF)). Various other kinds of synchronous listeners may be used in metering consumer 66 within the broad scope of the present embodiments.

In various embodiments, metering REST module 68 may be configured to interface with REST based metering clients. In various embodiments, metering REST module 68 may expose the metering service core APIs to third parties (such as application developers). A device at subscriber 16 can invoke REST APIs and push metering attributes 19 to SMF 12 through metering REST module 68. Metering REST module 68 may expose the following example APIs to application developers (and others appropriately): public Response uploadMeterable-ObjectZip(InputStream); public Response updateMeterableObjectDefintion(Meterable-Object meterableObject); public Response deleteMeterableObject(String identifier); public MeterableObject getMeterableObjectDetails(String identifier); public MeterableObject[ ] getMeterableObjectsByOwner(String ownerName); public Response addMeteredRecords-(MeteredRecord[ ] meteredRecords); public Response addOrUpdateMeteredRecords-(MeteredRecord[ ] meteredRecords); public Response addMeteredRecords(String metered-RecordsAsXML); public Response addOrUpdateMeteredRecords(String meteredRecords-AsXML); public MeteredRecordSearchResult searchMeteredRecords(MeteredRecordSearch searchCriteria); public InputStream exportSearchResultsToPDF(MeteredRecordSearch searchCriteria); public InputStream exportSearchResultsToCSV(MeteredRecordSearch searchCriteria); public InputStream exportSearchResultsToXLS(MeteredRecordSearch searchCriteria); public MeteredRecords getMeteredRecordsByIdentifier(String identifier, Business-Context businessContext, int startIndex, int pageSize). Other APIs may be exposed suitably based on particular needs within the broad scope of the embodiments. Metering consumer 66 and metering REST module 68 can extract metered record 60 in XML format, and convert it into a metered record object.

Metering plugin 70 may be configured to interface with metering agents 36 and obtain relevant information regarding metering event 14. In various embodiments, application developers can create metering plugin 70 and install metering plugin 70 in SMF engine 32. For example, SMF 12 may provide an open API with a standard interface, allowing third parties, like application developers, to create metering plugin 70 that can interact with SMF 12 and application 18. In some embodiments, metering plugin 70 can include extensions (e.g., programs that can extend listening capabilities of SMF 12), or specific plugins tailored to individual applications. In various embodiments, metering plugin 70 can be used by the device at subscriber 16 to pull metered record 60 to SMF 12. In some embodiments, metering consumer 66 and metering REST module 68 may enable pushing metered record 60 to SMF 12, and metering plugin 70 may enable pulling metered record 60 to SMF 12.

A metering service Data Access Object (DAO) layer 74 can facilitate interactions with SMF database 38 (e.g., metering service DAO layer 74 can be invoked to persist metered record 60 in SMF database 38), and a metering service reporting component 78 can facilitate report generation in a wide variety of formats, including Portable Document Format (PDF), Comma Separated Values (CSV), Microsoft Excel format (XLS), in response to search queries by subscriber 16. Metering service DAO layer 74 can provide an abstract interface to SMF database 38 or other persistence mechanism. Metering service DAO layer 74 can provide specific data operations (e.g., searching, retrieving, etc.) without exposing details of SMF database 38. For example, a search input for identity id of 1 and total time of 110 for a specific "identifier" corresponding to a specific meterable object 44 may be as follows: <meteredRecordSearch>; <identifier>identifier</identifier>; <searchAttributes>; <name>identityid</name>; <value>1</value>; </searchAttributes>; <searchAttributes>; <name>total_time</name>; <value>110</value>; </searchAttributes>; </meteredRecordSearch>.

Figure 5:
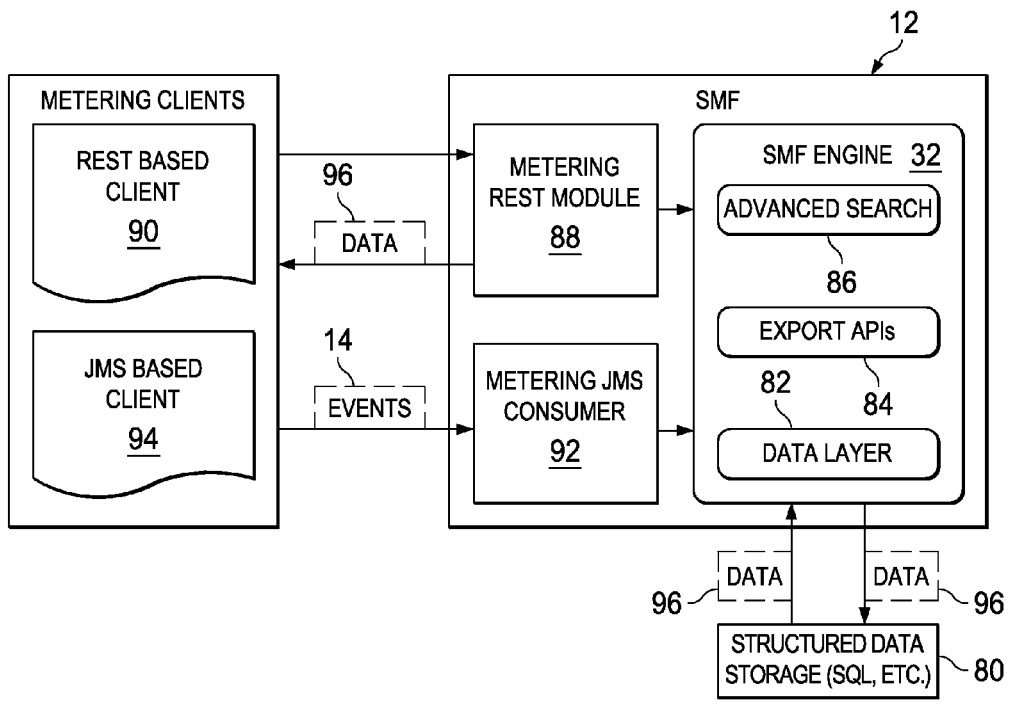
FIG. 5 is a simplified block diagram illustrating a logical view of some example details according to an embodiment of the communication system.

Turning to FIG. 5, FIG. 5 is a simplified block diagram illustrating example details of an embodiment of communication system 10. A structured data storage 80 may be a specific embodiment of SMF database 38. A data layer 82 may be based on top of structured data storage 80. Export APIs 84 and advanced search 86 may operate on data layer 82.

For example, Export APIs 84 may allow for the definition of appropriate data entities within SMF 12. Advanced search 86 may allow for searching metered records (e.g., metered record 60) by way of metering attributes (e.g., metering attribute 46).

SMF 12 may further include metering REST module 88, which can interface with a REST based client 90, and a metering JMS consumer 92, which can interface with a JMS based client 94. In some embodiments, an XMPP based listener may be implemented, which can interface with an XMPP based client (not shown). REST based client 90 may include a REST event transmitter that can synchronously send information regarding metering event 14 to REST module 88. JMS based client 94 can include a JMS based event transmitter that can synchronously send information regarding metering event 14 to JMS consumer 92.

REST based client 90 and JMS based client 94 may be located within cloud 30 in some embodiments (e.g., cloud platform can act as client). In other embodiments, REST based client 90 and JMS based client 94 may be located at application 18. In yet other embodiments, REST based client 90 and JMS based client 94 may be located at one or more subscribers (e.g., subscriber 16). For example, a video server in cloud 30 may host a video application 18, which can include REST based client 90. In another example, a user's smart-phone can include JMS based client 94, which can push metering data to SMF 12. In yet other embodiments, REST based client 90 and JMS based client 94 may be located at both application 18 and at one or more subscribers (e.g., subscriber 16).

Some clients may include both REST based client 90 and JMS based client 94. Other clients may include one of REST based client 90 and JMS based client 94. REST based client 90 and JMS based client 94 are indicated herein as examples merely for ease of illustration. Any other protocol or appropriate programming interfaces may be used to achieve the functionalities described herein, within the broad scope of the embodiments.

In some embodiments, information regarding metering event 14 can include values of metering attributes tracked into metered record 60. Such information may be communicated as data 96 between metering clients (e.g., REST based client 90 and JMS based client 94) and SMF 12. For example, REST based metering client 90 may generate metered record 60 according to REST API information provided by metering REST module 88. Metered record 60 may be sent as data 96 to SMF 12. Data 96 may also be communicated with structured data storage 80 appropriately.

Figure 6:
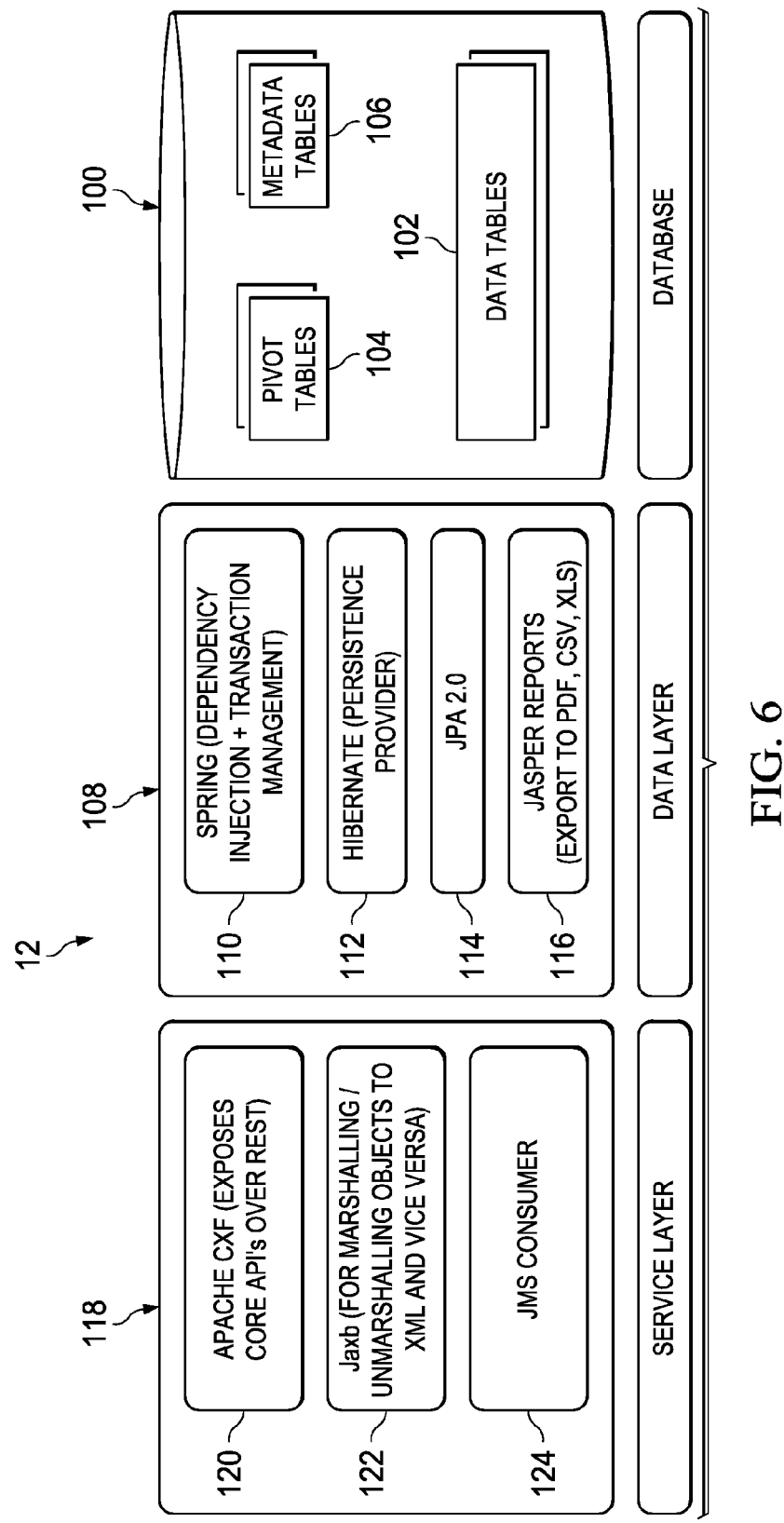
FIG. 6 is a simplified block diagram illustrating an example architecture according to an embodiment of the communication system.

Turning to FIG. 6, FIG. 6 is a simplified block diagram illustrating details of an architecture of SMF 12 according to an example embodiment of communication system 10. Database 100 includes data tables 102, pivot tables 104, and metadata tables 106. Database 100 may not have any fixed schema, and its definition can be dynamic. Data may be stored in data tables 102; index and unique key constraints may be managed by pivot tables 104. Metadata tables 105 may include information about different metering attributes (e.g., metering attribute 46).

Data layer 108 may be implemented according to any prevailing industry standard. In a general sense, data layer 108 may collect, store, analyze and distribute information regarding metering event to database 100. Data layer 108 may include alternatively, or in combination: a Spring framework module 110 for dependency injection and transaction management; a Hibernate module 112 for persistence; a JPA 2.0 module 114 and a Jasper Reports module 116 that can enable exporting reports to PDF, CSV, XLS and other suitable formats.

Spring framework module 110 can provide for declaring dependencies between services in an XML format. Various other dependency injectors (e.g., PicoContainer, HiveMind, XWork, etc.) can also be used within the broad scope of the embodiments. Hibernate module 112 can facilitate the storage and retrieval of Java domain objects. For example, hibernate module 112 can map Java classes to database tables and Java data types to SQL data types, and provide additional functionalities like data query and retrieval, as needed. JPA 2.0 module 114 can manage relational data in SMF 12. Jasper Reports module 116 can provide a tool that can write to a variety of targets, including a screen, a printer, PDF, etc. Jasper reports module 116 can be used in Java enabled platforms to generate dynamic content. In various embodiments, modules 110 to 116 can operate alone, or co-operate to perform the functionalities described herein.

Data layer 108 may receive data objects and create them, or modify them, or integrate them, to facilitate a service layer 118 interacting with database 100. Service layer 118 can interact with data at a higher level of abstraction than data layer 108. Service layer 118 may include alternatively, or in combination: Apache CXF module 120 that can expose core APIs through REST; a Jaxb module 122 for marshalling/unmarshalling objects to XML and vice versa; and a JMS consumer 124. Service layer 118 may implement functionalities of SMF 12 and make them accessible to application 18 (or subscribers 16) as needed.

Apache CXF module 120 can expose core APIs of SMF 12 to application 18 and facilitate communication over a variety of transports, such as HTTP or JMS. Jaxb module 122 can facilitate XML binding in a Java architecture (e.g., facilitate data exchange in XML format, using Java programming tools). JMS consumer 124 operates as a synchronous event listener in Java architecture, listening to event information regarding metering event 14 from a JMS based metering client.

In various embodiments, service layer 118, data layer 108, and database 100 co-operate suitably to enable the various functionalities of SMF 12. The architecture illustrated in the FIGURE is merely an example Java based architecture integrated with REST based services. Any other suitable architecture may be implemented to perform the functionalities described herein within the broad scope of the embodiments.

Turning to FIG. 7, FIG. 7 is a simplified diagram illustrating an example meterable object 44 according to an embodiment of communication system 10. Meterable object 44 indicates an example video call that can be metered. Meterable object 44 may be identified as "video service" with owner "Cisco.com." Meterable object 44 may include various metering attribute 46, such as "sessionID" of type "string" with a display label of "Session ID;" "userId" of type "string" with a display label of "UserID;" "bytes_sent" of type "long" with a display label of "Bytes Sent;" and so on. Meterable object 44 may be identified by unique key 58 that can be a combination of session ID and user ID. Meterable object 44 may be formatted in XML. Meterable object 44 illustrated in FIG. 6 is merely an example, and is not a limitation. Any type of meterable object 44 may be defined, with any attributes and unique ID, within the broad scope of the embodiments.

Turning to FIG. 8, FIG. 8 is an example REST API 126 according to an embodiment of communication system 10. Example REST API 126 indicates a POST function that can upload meterable object 44. Meterable object 44 may be included as a compressed (e.g., zipped) XML file (e.g., metering.xml). In some embodiments, meterable object 44 may be uploaded to a metering client, which can fill in values of the attributes and generate metered record 60.

Turning to FIG. 9, FIG. 9 illustrates example search reports generated according to an embodiment of communication system 10. Report 128 may be formatted in PDF, and report 130 may be formatted in XLS, based on particular configuration needs. Any other suitable format may also be used within the broad scope of the embodiments. Reports may be formatted and displayed on a computer screen; reports may be formatted and printed out on a printer; and reports may be otherwise formatted to be viewed and/or analyzed in a suitable manner.

Turning to FIG. 10, FIG. 10 is a simplified block diagram illustrating example details of a photo printing service application 18 according to an example embodiment of communication system 10. Photo storage service 132 can provide APIs for storing images and retrieving them; printing service 134 can enable customers to print photos in various formats and sizes; and shipping service 136 can provide different ways in which the printed material can reach the customers. A photo service controller 138 can configure and control photo storage service 132, printing service 134, and shipping service 136. A meter usage and subscriptions module 140 may track usage and subscriptions of the various services in application 18. An application model driven metering module 142 may track metering attributes configured by photo service controller 138.

In scenarios where resource usage based metering approach is used, the storage space used by photo storage service 132 per customer, and print-outs delivered per customer may be tracked by meter usage and subscriptions module 140. In scenarios where subscription based metering is used can limit track the resources used per subscription, or the number of subscriptions to a resource (e.g., 1000 photo storage per single user subscription; 100 photo prints per month per single user subscription; etc.). However, there may be scenarios where metering according to business context may improve customer experience with metering and billing. For example, holiday postcard prints may be metered as 'specials print' vs. 'regular print;' overdue shipments may be metered and billed as 'overdue' events; loyal returning customers may be charged per 102 prints vs. 100 prints for other customers, etc.

On a service delivery platform, there can be several service compositions executing simultaneously (e.g., in parallel). A cloud platform developer can add inherent capability to meter the hardware resources being used such as memory or CPU. Capability to have out of the box subscription models for photo printing or burger making or social chatting services or such other disparate applications can also be added, with certain limitations. However, because the platform developers may not have insight into specific business contexts of the individual applications, such resource based metering and subscription may not fulfill applications' business specific metering needs. With SMF 12, and application model driven metering module 142, metering capabilities provided by meter usage and subscriptions module 140 may be complemented and improved to provide application specific metering.

Turning to FIG. 11, FIG. 11 is a simplified sequence diagram illustrating example operations that may be associated with a video chat session according to an embodiment of communication system 10. Example sequence 150 may include operations by portal 152 (e.g., at subscriber 16), gateway 154 (e.g., to cloud 30), connector 156 (e.g., to enable secure service delivery), service bridge 158 (e.g., that provide network connectivity within cloud 30), SWF 160 (e.g., that provide appropriate video capabilities), metering service 162 (e.g., to meter application 18), adapter 164 (e.g., to connect to media server) and media server 166 (e.g., that hosts application 18).

Operations 150 may include 170, at which a request to start a chat session may be communicated by portal 152 to gateway 172. At 172, gateway 154 may transmit the request to connector 156. At 174, connector 156 may request service bridge 158 to start the chat session. At 160, service bridge 158 may request SWF 160 to start the appropriate service. At 178, the request to start the chat session may be communicated to adapter 164, and the request may be transmitted at 180 to media server 166. At 182, the URL of the chat session at application 18 may be communicated by media server 166 to adapter 164. At 84, the chat session URL may be communicated to SWF 160, and further transmitted to service bridge 158 at 186, to connector 156, at 188, to gateway 154 at 190 and to portal 152 at 192.

After the chat session, portal 152 may request adapter 164 to end the session at 194. At 196, the request may be communicated to media server 166. Media server 166 may respond with an end session callback at 198, which may cause adapter 164 to add or update metered record 60 at 200 with metering service 162. Metering service 162 may respond (e.g., with a "success" or "failure") appropriately at 202. Metering attribute 46 may be tracked appropriately by metering service 162 through suitable APIs as discussed herein.

Turning to FIG. 12, FIG. 12 is a simplified flow chart illustrating example operations that may be associated with SMF 12 according to an embodiment of communication system 10. Operations 210 may include 212, at which meterable object 44 may be defined with appropriate metering attribute 46. For example, meterable object 44 may be defined according to SMF data structure 40 in XML format. At 214, meterable object 44 may be associated with metering event 14 by suitable event tag 50. For example, meterable object 44 may be formatted into XML, and enveloped in event tag 50.

At 216, metering event 14 may be detected substantially simultaneously as a runtime execution of application 18. At 218, metering attributes may be tracked. At 220, metered record 60 may be generated based on meterable object 44 for metering event 14. At 222, metered record 60 may be saved in SMF database 38. At 224, metered record 60 maybe searched for and retrieved based on metering attribute 46 and values thereof. At 226, metered record 60 may be analyzed for billing and reporting. At 228, a report may be generated suitably. At 230, alternatively, or additionally, a bill may be generated that includes the relevant metering events.

Turning to FIG. 13, FIG. 13 is a simplified flow diagram illustrating example operations 250 that may be associated with SMF 12 according to an embodiment of communication system 10. Operations 250 include 252, at which APIs are exposed to third parties, such as application developers. At 254, SMF 12 may receive an event notification over JMS, where the event notification includes metered record 60. Alternatively, or additionally, at 256, metered record 60 may be received (or alternatively, generated) over REST API. Metered record 60 may include metering attribute 46 defined by the application developers, and formatted according to SMF data structure 40. Each application 18 may have separate metering attributes, defined separately and independently by the respective application developers. The cloud platform developer provides SMF 12 to enable the application developers to define metering event 14 and a related metering attribute 46 appropriately. At 258, metered record

60 may be saved in SMF database 38. At 260, SMF 12 may facilitate searching and retrieving metered record 60 according to metering attribute 46.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, SMF 12. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, SMF 12 described and shown herein (and/or its associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 64, SMF database 38, structured data storage 80, database 100) can store data used for the operations described herein. This includes the memory element being able to store instructions (e.g., software, logic, code, etc.) in non-transitory media such that the instructions are executed to carry out the activities described in this Specification.

A processor can execute any type of instructions associated with the data to achieve the operations detailed herein in this Specification. In one example, processors (e.g., processor 62) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in communication system 10 can include one or more memory elements (e.g., memory element 64, SMF database 38, structured data storage 80, database 100) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs.

The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed at a service metering framework (SMF) engine including a processor, comprising:
   interfacing, by an event listener at the SMF engine, with an application being executed in a cloud by a remote client device through a metering plugin tailored to the application, with different applications being associated with different metering plugins, the metering plugin being programmed to indicate metering events to the event listener;
   detecting, by the event listener, a metering event associated with an operation in the application during execution of the application, the metering event including at least one metering attribute of the application, with different applications having correspondingly different metering attributes associated with respective functionalities inside application contexts;
   receiving, at the metering plugin, a value of the at least one metering attribute associated with the metering event in a formatted metered record; and
   storing the at least one metering attribute and the value as the formatted metered record in a SMF database searchable according to the metering attribute.

2. The method of claim 1, wherein the event listener comprises at least one of a synchronous listener and an asynchronous listener.

3. The method of claim 1, wherein the event listener exposes an application programming interface (API) of the SMF engine to the application facilitating definitions of the metering event and the at least one metering attribute in the application.

4. The method of claim 1, wherein the event listener interfaces with a metering client that sends information regarding the metering event to the event listener.

5. The method of claim 4, wherein the metering client synchronously sends information regarding the metering event to the event listener during occurrence of the metering event.

6. The method of claim 1, wherein the event listener comprises a metering consumer.

7. The method of claim 1, wherein the event listener comprises a REpresentational State Transfer (REST) module.

8. The method of claim 1, wherein the metering plugin is configured to interface with a metering agent.

9. The method of claim 1, wherein the application is configured with a meterable object indicating the at least one metering attribute prior to execution of the application by the remote client device, wherein the value is populated during execution of the application.

10. The method of claim 1, wherein the metering event is detected based on at least one of metadata definitions added during execution of the application and metadata definitions added prior to execution of the application.

11. Non-transitory computer readable media encoding logic that includes instructions for execution by a processor of an SMF engine to perform operations comprising:
   interfacing, by an event listener at the SMF engine, with an application being executed in a cloud by a remote client device through a metering plugin tailored to the application, with different applications being associated with different metering plugins, the metering plugin being programmed to indicate metering events to the event listener;
   detecting, by the event listener, a metering event associated with an operation in the application during execution of the application, the metering event including at least one metering attribute of the application, with different applications having correspondingly different metering attributes associated with respective functionalities inside application contexts; and
   receiving, at the metering plugin, a value of the at least one metering attribute associated with the metering event in a formatted metered record; and
   storing the at least one metering attribute and the value as the formatted metered record in a SMF database searchable according to the metering attribute.

12. The media of claim 11, wherein the event listener comprises at least one of a synchronous listener and an asynchronous listener.

13. The media of claim 11, wherein the event listener exposes an API of the SMF engine to the application facilitating definitions of the metering event and the at least one metering attribute in the application.

14. The media of claim 11, wherein the event listener interfaces with a metering client that sends information regarding the metering event to the event listener.

15. The media of claim 11, wherein the application is configured with a meterable object indicating the at least one metering attribute prior to execution of the application by the remote client device, wherein the value is populated during execution of the application.

16. An apparatus implementing an SMF engine, comprising:
   an event listener;
   a metering plugin;
   a memory element to store data; and
   a processor to execute instructions associated with the data, wherein the event listener, the processor and the memory element cooperate such that the apparatus is configured for:
      interfacing, by the event listener, with an application being executed in a cloud by a remote client device through the metering plugin, wherein the metering plugin is tailored to the application, with different applications being associated with different metering plugins, the metering plugin being programmed to indicate metering events to the event listener;
      detecting, by the event listener, a metering event associated with an operation in the application during execution of the application, the metering event including at least one metering attribute of the application, with different applications having correspondingly different metering attributes associated with respective functionalities inside application contexts;
      receiving, at the metering plugin, a value of the at least one metering attribute associated with the metering event in a formatted metered record; and
      storing the at least one metering attribute and the value as the formatted metered record in a SMF database searchable according to the metering attribute.

17. The apparatus of claim 16, wherein the event listener comprises at least one of a synchronous listener and an asynchronous listener.

18. The apparatus of claim 16, wherein the event listener exposes an API of the SMF engine to the application facilitating definitions of the metering event and the at least one metering attribute in the application.

19. The apparatus of claim 16, wherein the event listener interfaces with a metering client that sends information regarding the metering event to the event listener.

20. The apparatus of claim 16, wherein the application is configured with a meterable object indicating the at least one metering attribute prior to execution of the application by the remote client device, wherein the value is populated during execution of the application.

* * * * *